United States Patent
Weidmann et al.

(10) Patent No.: US 10,988,415 B2
(45) Date of Patent: Apr. 27, 2021

(54) DISPERSANT FOR CALCIUM SULPHATE-BASED COMPOSITIONS

(71) Applicant: SIKA TECHNOLOGY AG, Baar (CH)

(72) Inventors: Jürg Weidmann, Winterthur (CH); Christina Hampel, Rütihof (CH); Jörg Zimmermann, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 215 days.

(21) Appl. No.: 15/762,521

(22) PCT Filed: Sep. 22, 2016

(86) PCT No.: PCT/EP2016/072545
§ 371 (c)(1),
(2) Date: Mar. 22, 2018

(87) PCT Pub. No.: WO2017/050896
PCT Pub. Date: Mar. 30, 2017

(65) Prior Publication Data
US 2019/0300431 A1    Oct. 3, 2019

(30) Foreign Application Priority Data
Sep. 24, 2015 (EP) .................................. 15186755

(51) Int. Cl.
*C04B 24/26* (2006.01)
*C04B 24/16* (2006.01)
(Continued)

(52) U.S. Cl.
CPC ........ *C04B 24/2647* (2013.01); *C04B 24/165* (2013.01); *C04B 24/246* (2013.01);
(Continued)

(58) Field of Classification Search
CPC . C04B 24/2647; C04B 24/265; C04B 24/165; C04B 24/246; C04B 24/2658; C04B 24/267; C04B 24/14
See application file for complete search history.

(56) References Cited

U.S. PATENT DOCUMENTS 2,743,241 A    4/1956  Groote
2,743,255 A    4/1956  Groote
(Continued)

FOREIGN PATENT DOCUMENTS

CN    1643013 A    7/2005
CN    1948206 A    4/2007
(Continued)

OTHER PUBLICATIONS

Dec. 15, 2016 International Search Report issued in International Patent Application No. PCT/EP2016/072545.
(Continued)

*Primary Examiner* — Ling Siu Choi
*Assistant Examiner* — David L Miller
(74) *Attorney, Agent, or Firm* — Oliff PLC (57) ABSTRACT

The present invention relates to the use of a copolymer as a dispersant for binder compositions based on calcium sulfate, the copolymer having a polymer backbone and sidechains bound thereto, and at least one ionizable monomeric unit M1 and at least one sidechain-carrying monomeric unit M2, characterized in that the copolymer has, in a direction along the polymer backbone, a non-random distribution of the monomeric units M1 and/or of the monomeric units M2.

10 Claims, 1 Drawing Sheet

(51) Int. Cl.
*C04B 24/24* (2006.01)
*C04B 28/14* (2006.01)
*C08F 293/00* (2006.01)
*C04B 103/00* (2006.01)
*C04B 103/40* (2006.01)

(52) U.S. Cl.
CPC ........ *C04B 24/267* (2013.01); *C04B 24/2658* (2013.01); *C04B 28/14* (2013.01); *C08F 293/005* (2013.01); *C04B 2103/0061* (2013.01); *C04B 2103/0063* (2013.01); *C04B 2103/408* (2013.01); *C08F 2438/03* (2013.01)

(56) References Cited

U.S. PATENT DOCUMENTS

| | | | |
|---|---|---|---|
| 3,949,076 | A | 4/1976 | Bender et al. |
| 6,291,573 | B1 | 9/2001 | Pakusch et al. |
| 7,425,596 | B2 * | 9/2008 | Kraus ............... C08F 293/005 525/329.7 |
| 7,985,424 | B2 | 7/2011 | Tomalia et al. |
| 8,063,161 | B2 | 11/2011 | Dershem |
| 2005/0228142 | A1 | 10/2005 | Kraus et al. |
| 2010/0137476 | A1 * | 6/2010 | Sulser ................... C04B 28/14 524/5 |
| 2011/0160351 | A1 * | 6/2011 | Hampel ................. C04B 28/147 524/5 |
| 2012/0016059 | A1 | 1/2012 | Faure et al. |
| 2013/0303663 | A1 | 11/2013 | Agnely et al. |

FOREIGN PATENT DOCUMENTS

| | | |
|---|---|---|
| EP | 0 924 241 A2 | 6/1999 |
| EP | 1 110 981 A2 | 6/2001 |
| EP | 1 138 697 A1 | 10/2001 |
| EP | 1 767 564 A2 | 3/2007 |
| FR | 2 949 777 A1 | 3/2011 |
| FR | 2 969 156 A1 | 6/2012 |
| JP | 2005-535758 A | 11/2005 |
| JP | 2010-528976 A | 8/2010 |
| WO | 92/019601 A1 | 11/1992 |
| WO | 03/062293 A1 | 7/2003 |
| WO | 2004/016668 A1 | 2/2004 |
| WO | 2011/015780 A1 | 2/2011 |
| WO | 2012/028668 A1 | 3/2012 |
| WO | 2015/144886 A1 | 10/2015 |

OTHER PUBLICATIONS

Koltzenberg et al., "Polymere: Synthese, Synthese and Eigenschaften," Springer Spektrum, pp. 246-258 and 386-393.

* cited by examiner

DISPERSANT FOR CALCIUM SULPHATE-BASED COMPOSITIONS

TECHNICAL FIELD

The invention relates to the use of a copolymer as dispersant for binder compositions based on calcium sulfate, wherein the copolymer comprises a polymer backbone and side chains bonded thereto and there are at least one ionizable monomer unit M1 and at least one side chain-bearing monomer unit M2. The invention further relates to a binder composition comprising a copolymer and to a shaped body obtainable therefrom.

PRIOR ART

Dispersants or fluxes are used in the building industry as plasticizers or water-reducing agents for mineral binder compositions, for example concrete, mortar, cements, gypsums and lime. The dispersants are generally organic polymers which are added to the makeup water or admixed with the binder compositions in solid form. In this way, it is advantageously possible to alter both the consistency of the binder composition during processing and the properties in the hardened state.

Known particularly effective dispersants are, for example, comb polymers based on polycarboxylate (PCE). Comb polymers of this kind have a polymer backbone and side chains bonded thereto. Corresponding polymers are described, for example, in EP 1 138 697 A1 (Sika AG).

Likewise known as concrete additives are copolymer mixtures as mentioned, for example, in EP 1 110 981 A2 (Kao). The copolymer mixtures are prepared by converting ethylenically unsaturated monomers in a free-radical polymerization reaction, wherein the molar ratio of the two monomers is altered at least once during the polymerization process.

However, it has been found that the known concrete dispersants can only be used to a limited degree for calcium sulfate-based compositions or gypsum compositions. The known concrete dispersants often cause such retardation in compositions of this kind that they are difficult to set and/or the desired plasticizing effect is not achieved. Especially in the case of production of gypsum boards and screeds, high demands are made on the dispersants.

In this connection, WO 2012/028668 A1 (Sika Technology AG), for example, describes a polymer mixture composed of two polymers which differ in terms of the acid content and are especially suitable for gypsum compositions. Dispersants of this kind are indeed effective, but involve a high level of complexity particularly in the production thereof.

There is therefore still a need for improved dispersants for calcium sulfate-based compositions that do not have the disadvantages mentioned.

SUMMARY OF THE INVENTION

It is therefore an object of the invention to overcome the aforementioned disadvantages. More particularly, a dispersant is to enable effective plasticization and good processing of calcium sulfate-based binder compositions. In particular, the dispersant is to impair the setting characteristics of the calcium sulfate-based binder compositions to a minimum degree. Specifically, the dispersants used are to retard the setting of the calcium sulfate-based binder compositions to a minimum degree, if at all. Moreover, what is desired is the provision of a dispersant which can be produced in a flexible and controlled manner.

It has been found that, surprisingly, this object can be achieved by the features of independent claim 1.

The core of the invention is accordingly the use of a copolymer as dispersant for binder compositions based on calcium sulfate, wherein the copolymer comprises a polymer backbone and side chains bonded thereto and there are at least one ionizable monomer unit M1 and at least one side chain-bearing monomer unit M2, characterized in that the copolymer has a nonrandom distribution of the monomer units M1 and/or the monomer units M2 in a direction along the polymer backbone.

As has been found, surprisingly, copolymers of this kind can achieve good plasticizing effects and simultaneously relatively short setting times in binder compositions based on calcium sulfate. Moreover, the copolymers used in accordance with the invention can be produced in a reliable manner in a wide variety of different modifications in efficient methods.

Further aspects of the invention are the subject of further independent claims. Particularly preferred embodiments of the invention are the subject of the dependent claims.

WAYS OF EXECUTING THE INVENTION

A first aspect of the present invention relates to the use of a copolymer as dispersant for binder compositions based on calcium sulfate, wherein the copolymer comprises a polymer backbone and side chains bonded thereto and there are at least one ionizable monomer unit M1 and at least one side chain-bearing monomer unit M2, characterized in that the copolymer has a nonrandom distribution of the monomer units M1 and/or the monomer units M2 in a direction along the polymer backbone.

Copolymer

The terms "ionizable monomers" and "ionizable monomer units" especially mean monomers or polymerized monomers that are in anionic or negatively charged form at a pH>10, especially at a pH>12. These are especially H donor groups or acid groups. The ionizable groups are more preferably acid groups, for example carboxylic acid, sulfonic acid, phosphoric acid and/or phosphonic acid groups. Preference is given to carboxylic acid groups. The acid groups may also take the form of anions in deprotonated form or of a salt with a counterion or cation.

A "nonrandom distribution" is understood in the present case to mean a nonstatistical distribution of the monomer units M1 and/or the monomer units M2. This means that the ionizable monomer units M1 and/or the side chain-bearing monomer units M2 are arranged in the copolymer in an alternating or block-type manner and/or in a gradient structure, for example in at least one section. Preferably, the copolymer has at least one section having a gradient structure and/or a block structure.

The structure of the copolymers can be analyzed and determined, for example, by nuclear spin resonance spectroscopy (NMR spectroscopy). By $^{13}C$ NMR spectroscopy in particular, it is possible in a manner known per se to determine the sequence of the monomer units in the copolymer on the basis of neighboring group effects in the copolymer and using statistical evaluations.

The ionizable monomer units M1 preferably include acid groups, especially carboxylic acid, sulfonic acid, phosphoric acid and/or phosphonic acid groups.

The side chain-bearing monomer unit M2 especially includes polyalkylene oxide side chains, especially polyethylene oxide and/or polypropylene oxide side chains.

More particularly, the ionizable monomer units M1 have a structure of the formula I:

(I)

The side chain-bearing monomer units M2 preferably have a structure of the formula II:

(II)

where $R^1$, in each case independently, is —COOM, —SO$_2$—OM, —O—PO(OM)$_2$ and/or —PO(OM)$_2$, $R^2$, $R^3$, $R^5$ and $R^6$, in each case independently, are H or an alkyl group having 1 to 5 carbon atoms, $R^4$ and $R^7$, in each case independently, are H, —COOM or an alkyl group having 1 to 5 carbon atoms, or where $R^1$ forms a ring together with $R^4$ to give —CO—O—CO—, M, independently of one another, represents H+, an alkali metal ion, an alkaline earth metal ion, a di- or trivalent metal ion, an ammonium ion or an organic ammonium group;

m=0, 1 or 2, p=0 or 1,

X, in each case independently, is —O— or —NH—, $R^8$ is a group of the formula -[AO]$_n$—R$^a$ where A=C$_2$- to C$_4$-alkylene, R$^a$ is H, a C$_1$- to C$_{20}$-alkyl group, -cycloalkyl group or -alkylaryl group, and n=2-250, especially 10-200.

A molar ratio of the monomer units M1 to the monomer units M2 is advantageously in the range of 0.5-16, especially 1-12, preferably 1.2-8, further preferably 1.5-5 or 2-4.

More particularly, $R^1$=COOM, $R^2$=H or CH$_3$, $R^3$=R$^4$=H. It is thus possible to prepare the copolymer on the basis of acrylic or methacrylic acid monomers, which is of interest from an economic point of view. Moreover, copolymers of this kind in the present context result in a particularly good dispersing effect.

Likewise advantageously, $R^1$=COOM, $R^2$=H, $R^3$=H and $R^4$=COOM. Corresponding copolymers can be prepared on the basis of maleic acid monomers.

The X group in the ionizable monomer units M2, advantageously in at least 75 mol %, particularly in at least 90 mol %, especially in at least 95 mol % or at least 99 mol % of all monomer units M2, is —O— (=oxygen atom).

Advantageously, $R^5$=H or CH$_3$, $R^6$=R$^7$=H and X=—O—. It is thus possible to prepare the copolymers, for example, proceeding from (meth)acrylic esters, vinyl ethers, (meth)allyl ethers or isoprenol ethers.

In a particularly advantageous embodiment, $R^2$ and $R^5$ are each mixtures of 40-60 mol % of H and 40-60 mol % of —CH$_3$.

In a further advantageous embodiment, $R^1$=COOM, $R^2$=H, $R^5$=—CH$_3$ and $R^3$=R$^4$=R$^6$=R$^7$=H.

In another advantageous embodiment, $R^1$=COOM, $R^2$=R$^5$=H or —CH$_3$ and $R^3$=R$^4$=R$^6$=R$^7$=H.

Especially suitable copolymers are those in which $R^1$=COOM; $R^2$ and $R^5$ are each independently H, —CH$_3$ or mixtures thereof; $R^3$ and $R^6$ are each independently H or —CH$_3$, preferably H; $R^4$ and $R^7$ are each independently H or —COOM, preferably H.

The $R^8$ radical in the side chain-bearing monomer units M2, based on all the $R^8$ radicals in the monomer units, consists of a polyethylene oxide especially to an extent of at least 50 mol %, especially at least 75 mol %, preferably at least 95 mol % or at least 99 mol %.

A proportion of ethylene oxide units based on all the alkylene oxide units in the copolymer is especially more than 75 mol %, especially more than 90 mol %, preferably more than 95 mol % and specifically 100 mol %.

More particularly, $R^8$ has essentially no hydrophobic groups, especially no alkylene oxides having three or more carbon atoms. This especially means that a proportion of alkylene oxides having three or more carbon atoms based on all the alkylene oxides is less than 5 mol %, especially less than 2 mol %, preferably less than 1 mol % or less than 0.1 mol %. In particular, there are no alkylene oxides having three or more carbon atoms or the proportion thereof is 0 mol %.

$R^a$ is advantageously H and/or a methyl group. Particularly advantageously, A=C$_2$-alkylene and R$^a$ is H or a methyl group.

More particularly, the parameter n=10-150, especially n=15-100, preferably n=17-70, specifically n=19-45 or n=20-25. In particular, this achieves excellent dispersing effects within the preferred ranges specified.

Particular preference is given to copolymers wherein $R^1$=COOM; $R^2$ and $R^5$, independently of one another, are H, —CH$_3$ or mixtures thereof; $R^3$ and $R^6$, independently of one another, are H or —CH$_3$, preferably H; $R^4$ and $R^7$, independently of one another, are H or —COOM, preferably H; and where X in at least 75 mol %, particularly in at least 90 mol %, especially in at least 99 mol %, of all monomer units M2 is —O—.

It may further be advantageous when the copolymer comprises at least one further monomer unit MS which especially differs chemically from the monomer units M1 and M2. In particular, multiple different further monomer units MS may be present. In this way, it is possible to further modify the properties of the copolymer and to adjust them, for example, with regard to specific applications.

Particularly advantageously, the at least one further monomer unit MS is a monomer unit of the formula III:

where $R^{5'}$, $R^{6'}$, $R^{7'}$, m' and p' are as defined for $R^5$, $R^6$, $R^7$, m and p as described above;

Y, in each case independently, is a chemical bond or —O—;

Z, in each case independently, is a chemical bond, —O— or —NH—;

$R^9$, in each case independently, is an alkyl group, cycloalkyl group, alkylaryl group, aryl group, hydroxyalkyl group or acetoxyalkyl group, each having 1-20 carbon atoms.

Advantageous examples of further monomer units MS are those where m'=0, p'=0, Z and Y represent a chemical bond and $R^9$ is an alkylaryl group having 6-10 carbon atoms.

Also suitable are especially further monomer units MS in which m'=0, p'=1, Y is —O—, Z represents a chemical bond and $R^9$ is an alkyl group having 1-4 carbon atoms.

Further suitable are further monomer units MS where m'=0, p'=1, Y is a chemical bond, Z is —O— and $R^9$ is an alkyl group and/or a hydroxyalkyl group having 1-6 carbon atoms.

Particularly advantageously, the at least one further monomer unit MS consists of polymerized vinyl acetate, styrene and/or hydroxyalkyl (meth)acrylate, especially hydroxyethyl acrylate.

In particular, the polydispersity (=weight-average molecular weight $M_W$/number-average molecular weight $M_n$) of the copolymer is <1.5, particularly in the range of 1.0-1.4, especially 1.1-1.3.

A weight-average molecular weight $M_W$ of the overall copolymer is especially in the range of 10'000-150'000 g/mol, advantageously 12'000-80'000 g/mol, especially 12'000-50'000 g/mol. In the present context, molecular weights such as the weight-average molecular weight $M_W$ or the number-average molecular weight $M_n$ are determined by gel permeation chromatography (GPC) with polyethylene glycol (PEG) as standard. This technique is known per se to those skilled in the art.

The copolymer is particularly a polymer having essentially linear structure. This particularly means that all monomer units of the copolymer are arranged in a single and/or unbranched polymer chain. Specifically, the copolymer does not have a star-shaped structure and/or the copolymer is not part of a branched polymer. More particularly, the copolymer is not part of a polymer in which there are multiple, especially three or more, polymer chains running in different directions attached to a central molecule.

Copolymers with Gradient Structure

In a preferred embodiment, the copolymer has a gradient structure in at least one section AA in a direction along the polymer backbone with respect to the ionizable monomer unit M1 and/or with respect to the side chain-bearing monomer unit M2.

In other words, in the copolymer of the invention, there is a concentration gradient in at least one section AA in a direction along the polymer backbone with regard to the ionizable monomer unit M1 and/or with regard to the side chain-bearing monomer unit M2.

The term "gradient structure" or "concentration gradient" in the present case is especially a continuous change in the local concentration of a monomer unit in at least one section in a direction along the copolymer backbone. Another term for "concentration gradient" is "concentration slope".

The concentration gradient may, for example, be essentially constant. This corresponds to a linear decrease or increase in the local concentration of the respective monomer unit in the at least one section AA in the direction of the copolymer backbone. However, it is possible that the concentration gradient changes in the direction of the copolymer backbone. In this case, there is a nonlinear decrease or increase in the local concentration of the respective monomer unit. The concentration gradient extends especially over at least 10, especially at least 14, preferably at least 20 or at least 40, monomer units of the copolymer.

By contrast, abrupt or sharp changes in concentration of monomers as occur, for example, in the case of block copolymers are not referred to as a concentration gradient.

The expression "local concentration" in the present context refers to the concentration of a particular monomer at a given point in the polymer backbone. In practice, the local concentration or the mean of the local concentration can be ascertained, for example, by determining the monomer conversions during the preparation of the copolymer. In this case, the monomers converted within a particular period can be ascertained. The averaged local concentration especially corresponds to the ratio of the mole fraction of a particular monomer converted within the period of time in question to the total molar amount of the monomers converted within the period of time in question.

The conversions of the monomers can be determined in a manner known per se, for example, with the aid of liquid chromatography, especially high-performance liquid chromatography (HPLC), and taking account of the amounts of monomers used. The structure of the copolymers can also be determined as set out above by $^{13}C$ and $^1H$ NMR spectroscopy.

The copolymer may also have more than one section AA having a gradient structure, especially two, three, four or even more sections AA, which are arranged in succession, for example. If present, different gradient structures or concentration slopes may each be present in the different sections AA.

Preferably, in the at least one section AA, a local concentration of the at least one ionizable monomer unit M1 increases continuously along the polymer backbone, while a local concentration of the at least one side chain-bearing monomer unit M2 decreases continuously along the polymer backbone, or vice versa.

A local concentration of the ionizable monomer unit M1 at the first end of the at least one section AA is especially lower than at the second end of the section AA, while a local concentration of the side chain-bearing monomer unit M2 at the first end of the section AA is greater than at the second end of the section AA, or vice versa.

More particularly, in the case of a division of the at least one section AA into 10 subsections of equal length, the averaged local concentration of the at least one ionizable monomer unit M1 in the respective subsections along the polymer backbone increases in at least 3, especially in at least 5 or 8, successive subsections, while the averaged local concentration of the at least one side chain-bearing monomer unit M2 in the respective subsections along the polymer backbone decreases in at least 3, especially in at least 5 or 8, successive subsections, or vice versa.

Specifically, an increase or decrease in the averaged local concentration of the at least one ionizable monomer unit M1 in the successive subsections is essentially constant, while, advantageously, a decrease or increase in the averaged local concentration of the at least one side chain-bearing monomer unit M2 in the successive subsections is essentially likewise constant.

In an advantageous embodiment, the at least one section AA having the gradient structure, based on a total length of the polymer backbone, has a length of at least 30%, especially at least 50%, preferably at least 75% or 90%.

Advantageously, the at least one section AA, based on a total number of monomer units in the polymer backbone, has a proportion of at least 30%, especially at least 50%, preferably at least 75% or 90%, of monomer units.

In particular, the at least one section AA, based on the weight-average molecular weight of the overall copolymer, has a proportion by weight of at least 30%, especially at least 50%, preferably at least 75% or 90%.

Thus, the section AA with the concentration gradient or the gradient structure is of particular importance.

The at least one section AA having the concentration gradient advantageously comprises 5-70, especially 7-40, preferably 10-25, monomer units M1 and 5-70, especially 7-40, preferably 10-25, monomer units M2.

More particularly, the copolymer consists to an extent of at least 50 mol %, in particular at least 75 mol %, especially at least 90 mol % or 95 mol %, of ionizable monomer units M1 and side chain-bearing monomer units M2.

It is advantageous when at least 30 mol %, especially at least 50 mol %, preferably at least 75 mol %, in particular at least 90 mol % or at least 95 mol %, of the ionizable monomer units M1 are in the at least one section AA having a gradient structure.

Likewise advantageously, at least 30 mol %, especially at least 50 mol %, preferably at least 75 mol %, in particular at least 90 mol % or at least 95 mol %, of the side chain-bearing monomer units M2 are in the at least one section having a gradient structure.

Especially preferably, the two latter aforementioned conditions apply simultaneously.

In another advantageous embodiment, the copolymer, in addition to the at least one section AA having a gradient structure, has a further section AB, wherein there is essentially a constant local concentration of the monomers and/or a statistical or random distribution of the monomers over the entire section AB.

Section AB may consist, for example, of a single kind of monomers or of multiple different monomers in random distribution. In section AB, however, there is especially no gradient structure and no concentration gradient along the polymer backbone.

The copolymer may also have more than one further section AB, for example two, three, four or even more sections AB, which may differ from one another from a chemical and/or structural point of view.

Preferably, the at least one section AA directly adjoins the further section AB.

It has been found that, surprisingly, copolymers of this kind are even more advantageous under some circumstances with regard to the plasticizing effect and the maintenance thereof over time.

More particularly, the further section AB comprises ionizable monomer units M1 and/or side chain-bearing monomer units M2.

Based on all the monomer units present therein, the further section AB, in one embodiment of the invention, for example, comprises advantageously at least 30 mol %, especially at least 50 mol %, preferably at least 75 mol %, in particular at least 90 mol % or at least 95 mol %, of ionizable monomer units M1. Any proportion of side chain-bearing monomer units M2 present in the further section AB is particularly less than 25 mol %, especially less than 10 mol % or less than 5 mol %, based on all monomer units M1 in the further section. More particularly, there are no side chain-bearing monomer units M2 in the further section AB.

In a further and particularly advantageous implementation of the invention, the further section AB, based on all the monomer units present therein, comprises at least 30 mol %, especially at least 50 mol %, preferably at least 75 mol %, in particular at least 90 mol % or at least 95 mol %, of side chain-bearing monomer units M2. In this case, any proportion of ionizable monomer units M1 present in the further section AB is in particular less than 25 mol %, especially less than 10 mol % or less than 5 mol %, based on all monomer units M2 in the further section AB. More particularly, there are no ionizable monomer units M1 in the further section AB.

It has been found to be appropriate when the further section AB comprises a total of 5-70, especially 7-40, preferably 10-25, monomer units. These are especially ionizable monomer units M1 and/or side chain-bearing monomer units M2.

A ratio of the number of monomer units in the at least one section AA having gradient structure to the number of monomer units in the at least one further section AB having the essentially constant local concentration is advantageously in the range of 99:1-1:99, especially 10:90-90:10, preferably 80:20-20:80, especially 70:30-30:70.

If present, the at least one further monomer unit MS may be part of the at least one section AA and/or of the further section AB. It is also possible that the at least one further monomer unit MS is part of an additional section of the copolymer. More particularly, different further monomer units MS may be present in the different sections.

If present in the at least one section AA, the at least one further monomer unit MS advantageously has a proportion in the at least one section AA of 0.001-80 mol %, preferably 20-75 mol %, especially 30-70 mol %, based on all the monomer units in the first section AA.

If present in the further section AB, the at least one further monomer unit MS especially has a proportion in the further section AB of 0.001-80 mol %, preferably 20-75 mol %, especially 30-70 mol % or 50-70 mol %, based on all the monomer units in the further section AB.

In an advantageous embodiment, the at least one further monomer unit MS is present in the at least one section AA and/or in the further section AB with a proportion of 20-75 mol %, especially 30-70 mol %, based on all monomer units in the respective section.

In an advantageous embodiment, the copolymer consists of the at least one section AA. In another advantageous embodiment, the copolymer consists of the at least one section AA and the further section AB. The latter case in particular results in very good and long-lasting plasticizing effects.

However, it is also possible, for example, that the copolymer contains at least two different sections AA and/or at least two different further sections AB.

A particularly advantageous copolymer has at least one or more than one of the following features:
i) The copolymer consists to an extent of at least 75 mol %, especially at least 90 mol % or 95 mol %, of ionizable monomer units M1 and side chain-bearing monomer units M2;
ii) The copolymer comprises or consists of at least one section AA and a further section AB;
iii) The further section AB comprises side chain-bearing monomer units M2, especially at least 50 mol %, preferably at least 75 mol %, in particular at least 90 mol % or at least 95 mol %, based on all the monomer units present in the section AB. Any proportion of ionizable monomer units M1 present in the further section AB is less than 25 mol %, especially less than 10 mol % or less than 5 mol %, based on all monomer units M2 in the further section AB.
iv) A molar ratio of the monomer units M1 to the monomer units M2 in the copolymer is in the range of 0.5-6, preferably 0.8-3.5;
v) $R^1$ is COOM;
vi) $R^2$ and $R^5$ are H or $CH_3$, preferably $CH_3$;
vii) $R^3=R^4=R^6=R^7=H$;
viii) m=0 and p=1;
ix) X=—O—
x) A=$C_2$-alkylene and n=10-150, preferably 15-50;
xi) $R^a$=H or —$CH_3$, preferably $CH_3$.

Especially preferred is a copolymer consisting of sections AA and AB which has at least all the features (i)-(iv). Further preferred is a copolymer having all the features (i)-(xi). Even further preferred is a copolymer which fulfills all the features (i)-(xi) in the executions preferred in each case.

Copolymer with Block Structure

Likewise advantageous is a copolymer comprising at least one first block A and at least one second block B, wherein the first block A has an ionizable monomer unit M1 of the formula I and the second block B has a side chain-bearing monomer unit M2 of the formula II.

More particularly, any proportion of monomer units M2 present in the first block A is less than 25 mol %, especially not more than 10 mol %, based on all the monomer units M1 in the first block A, and any proportion of monomer units M1 present in the second block B is less than 25 mol %, especially not more than 10 mol %, based on all the monomer units M2 in the second block B.

Multiple different monomer units M1 of the formula I and/or multiple different monomer units M2 of the formula II may be present in the copolymer of the invention.

The monomer units M1 and any further monomer units in the first block A are especially in statistical or random distribution. The monomer units M2 and any further monomer units in the second block B are likewise especially in statistical or random distribution.

In other words, the at least one block A and/or the at least one block B preferably each take the form of a component polymer with random monomer distribution.

The at least one first block A advantageously comprises 5-70, especially 7-40, preferably 10-25, monomer units M1 and/or the at least one second block B comprises 5-70, especially 7-50, preferably 20-40, monomer units M2.

Preferably, any proportion of monomer units M2 present in the first block A is less than 15 mol %, particularly less than 10 mol %, especially less than 5 mol % or less than 1 mol %, based on all monomer units M1 in the first block A. In addition, any proportion of monomer units M1 present in the second block B is advantageously less than 15 mol %, particularly less than 10 mol %, especially less than 5 mol % or less than 1 mol %, based on all monomer units M2 in the second block B. Advantageously, both conditions are fulfilled at the same time.

Especially advantageously, for example, any proportion of monomer units M2 present in the first block A is less than 15 mol % (based on all the monomer units M1 in the first block A) and any proportion of monomer units M1 present in the second block B is less than 10 mol % (based on all the monomer units M2 in the second block B).

Thus, the monomer units M1 and M2 are essentially spatially separate, which is to the benefit of the dispersing effect of the copolymer and is advantageous with regard to the retardation problem.

The first block A, based on all the monomer units in the first block A, consists in particular to an extent of at least 20 mol %, particularly at least 50 mol %, especially at least 75 mol % or at least 90 mol %, of monomer units M1 of the formula I. The second block B, based on all the monomer units in the second block B, consists advantageously to an extent of at least 20 mol %, particularly at least 50 mol %, especially at least 75 mol % or at least 90 mol %, of monomer units M2 of the formula II.

A molar ratio of the monomer units M1 to the monomer units M2 in the copolymer is especially in the range of 0.5-6, especially 0.7-4, preferably 0.9-3.8, further preferably 1.0-3.7 or 2-3.5. This achieves an optimal dispersing effect in mineral binder compositions.

It may further be advantageous when the copolymer comprises at least one further monomer unit MS as described above. In particular, multiple different further monomer units MS may be present. In this way, it is possible to further modify the properties of the copolymer and to adjust them, for example, with regard to specific applications.

The at least one further monomer unit MS may be part of the first block A and/or of the second block B. It is also possible that the at least one further monomer unit MS is part of an additional block of the block copolymer. More particularly, different monomer units MS may be present in the different blocks.

If present in the first block A, the at least one further monomer unit MS advantageously has a proportion in the first block A of 0.001-80 mol %, preferably 20-75 mol %, especially 30-70 mol %, based on all the monomer units in the first block A.

If present in the second block B, the at least one further monomer unit MS especially has a proportion in the second block B of 0.001-80 mol %, preferably 20-75 mol %, especially 30-70 mol % or 50-70 mol %, based on all the monomer units in the second block B.

In an advantageous embodiment, the at least one further monomer unit MS is present in the first block A and/or in the second block B with a proportion of 20-75 mol %, especially 30-70 mol %, based on all monomer units in the respective block.

In a further advantageous embodiment, there is at least one further block C arranged between the first block A and the second block B, which differs chemically and/or structurally from the first and second blocks.

Advantageously, the at least one further block C comprises or consists of monomer units MS as described above. However, it is also possible for further monomer units to be present in addition to or in place of the monomer units MS.

More particularly, the at least one further block C consists to an extent of at least 50 mol %, especially at least 75 mol %, preferably at least 90 mol % or at least 95 mol %, of monomer units MS as described above.

In a particularly advantageous embodiment, the block copolymer of the invention is a diblock copolymer consisting of a block A and a block B.

Likewise suitable are block copolymers containing at least two blocks of the first block A and/or at least two blocks of the second block B. More particularly, these are block copolymers containing two instances of the first block A and one instance of the second block B, or block copolymers containing one instance of the first block A and two instances of the second block B. Block copolymers of this kind especially take the form of triblock copolymers, tetrablock copolymers or pentablock copolymers, preferably triblock copolymers. There are one or two further blocks present in the tetrablock copolymers and the pentablock copolymers, for example blocks of the C block type as described above.

A particularly advantageous block copolymer has at least one or more than one of the following features:
i) Block A has 7-40, especially 10-25, monomer units M1 and block B has 7-50, especially 20-40, monomer units M2.
ii) The first block A, based on all the monomer units in the first block A, consists to an extent of at least 75 mol %, preferably at least 90 mol %, of monomer units M1 of the formula I;
iii) The second block B, based on all the monomer units in the second block B, consists to an extent of at least 75 mol %, preferably at least 90 mol %, of monomer units M2 of the formula II;
iv) A molar ratio of the monomer units M1 to the monomer units M2 in the block copolymer is in the range of 0.5-6, preferably 0.8-3.5;
v) $R^1$ is COOM;
vi) $R^2$ and $R^5$ are H or $CH_3$, preferably $CH_3$;
vii) $R^3=R^4=R^6=R^7=H$;
viii) m=0 and p=1;
ix) X=—O—
x) A=$C_2$-alkylene and n=10-150, preferably 15-50;
xi) $R^a$=H or —$CH_3$, preferably $CH_3$.

Especially preferred is a diblock copolymer consisting of blocks A and B which has at least all the features (i)-(iv). Further preferred is a diblock copolymer having all the features (i)-(xi). Even further preferred is a diblock copolymer which fulfills all the features (i)-(xi) in the executions preferred in each case.

Likewise advantageous is a triblock copolymer consisting of the blocks A, B and C, especially in the sequence A—C—B, where the triblock copolymer has at least all the features (i)-(iv). Further preferred is a triblock copolymer having all the features (i)-(xi). Even further preferred is a triblock copolymer which fulfills all the features (i)-(xi) in the executions preferred in each case. Block C advantageously comprises monomer units MS as described above, or block C consists thereof.

In a specific embodiment, these diblock copolymers or triblock copolymers also include, in block A and B, additionally a further monomer unit MS as described above, especially a further monomer unit MS of the formula III.

Preparation of Copolymers

A further aspect of the present invention relates to a process for preparing a copolymer, especially a copolymer as described above, wherein ionizable monomers m1 and side chain-bearing monomers m2 are polymerized together to form a nonrandom distribution of the ionizable monomers m1 and/or the side chain-bearing monomers m2.

The ionizable monomers m1, on completion of polymerization, correspond to the abovementioned ionizable monomer units M1 of the copolymer. The side chain-bearing monomers m2, on completion of polymerization, likewise correspond to the above-described side chain-bearing monomer units M2.

The side chain-bearing monomers m2 especially include polyalkylene oxide side chains, preferably polyethylene oxide and/or polypropylene oxide side chains.

The ionizable monomers m1 preferably include acid groups, especially carboxylic acid, sulfonic acid, phosphoric acid and/or phosphonic acid groups.

More particularly, the ionizable monomers m1 have a structure of the formula IV:

The side chain-bearing monomers m2 preferably have a structure of the formula V:

where the $R^1$-$R^8$, X groups and the parameters m and p are defined as described above in connection with the copolymer.

In a further advantageous embodiment, there is at least one further monomer ms present during the polymerization, which is polymerized, and this is especially a monomer of the formula VI:

where $R^{5'}$, $R^{6'}$, $R^{7'}$, $R^9$, Y, Z, m' and p' are defined as described above.

The copolymer is especially prepared by a living free-radical polymerization.

A free-radical polymerization can basically be divided into three steps: initiation, growth and termination.

"Living free-radical polymerization" is also referred to as "controlled free-radical polymerization" and is known per se to the person skilled in the art in other contexts. The term comprehends chain growth processes in which essentially no chain termination reactions (transfer and termination) take place. Living free-radical polymerization thus proceeds essentially in the absence of irreversible transfer or termination reactions. These criteria can be fulfilled, for example, when the polymerization initiator is already used up at a very early stage during the polymerization and there is exchange between species of different reactivity that proceeds at least as rapidly as the chain propagation itself. The number of active chain ends especially remains essentially constant during the polymerization. This enables essentially simultaneous growth of the chains that continues over the entire polymerization process. This correspondingly results in a narrow molecular weight distribution or polydispersity.

In other words, controlled free-radical polymerization or living free-radical polymerization is particularly notable for reversible or even absent termination or transfer reactions. After the initiation, the active sites are accordingly conserved over the entire reaction. All polymer chains are formed (initiated) simultaneously and grow continuously over the entire time. The free-radical functionality of the active site is ideally conserved even after complete conversion of the monomers to be polymerized. This exceptional property of the controlled polymerizations enables preparation of well-defined structures such as gradient or block copolymers through sequential addition of different monomers.

By contrast, in conventional free-radical polymerization as described, for example, in EP 1 110 981 A2 (Kao), all three steps (initiation, growth and termination) proceed in parallel. The lifetime of each of the active, growing chains is very low and the monomer concentration during the chain growth of a chain remains essentially constant. The polymer chains thus formed do not have any active sites suitable for an addition of further monomers. Thus, this mechanism does not permit any control over the structure of the polymers. The preparation of gradient or block structures by means of conventional free-radical polymerization is therefore typically not possible (see, for example, "Polymere: Synthese, Synthese und Eigenschaften" [Polymers: Synthesis, Synthesis and Properties]; authors: Koltzenburg, Maskos, Nuyken; publisher: Springer Spektrum; ISBN: 97-3-642-34772-6 and "Fundamentals of Controlled/living Radical Polymerization"; publisher: Royal Society of Chemistry; editors: Tsarevsky, Sumerlin; ISBN: 978-1-84973-425-7).

Thus, there is a clear distinction of "living free-radical polymerization" from conventional "free-radical polymerization" or free polymerization conducted in a non-living or non-controlled manner.

The polymerization is preferably effected by reversible addition-fragmentation chain-transfer polymerization (RAFT), nitroxide-mediated polymerization (NMP) and/or atom transfer radical polymerization (ATRP).

In reversible addition-fragmentation chain-transfer polymerization, control over the polymerization is achieved by a reversible chain transfer reaction. Specifically, a growing free-radical chain adds on what is called a RAFT agent, which leads to formation of an intermediate free radical. The RAFT agent then fragments, in such a way as to reform another RAFT agent and a free radical available for propagation. In this way, the probability of propagation is distributed uniformly over all chains. The average chain length of the polymer formed is proportional to the RAFT agent concentration and to the reaction conversion. RAFT agents used are especially organic sulfur compounds. Particularly suitable are dithioesters, dithiocarbamates, trithiocarbonates and/or xanthates. The polymerization can be initiated in a conventional manner by means of initiators or thermal self-initiation.

In nitroxide-mediated polymerization, nitroxides react reversibly with the active chain end to form what is called a dormant species. The equilibrium between active and inactive chain ends is strongly to the side of the dormant species, which means that the concentration of active species is very low. The probability of two active chains meeting and terminating is thus minimized. An example of a suitable NMP agent is 2,2,6,6-tetramethylpiperidine N-oxide (TEMPO).

In atom transfer radical polymerization (ATRP), the concentration of free radicals is lowered by addition of a transition metal complex and a controlling agent (halogen-based) to such an extent that chain termination reactions, such as disproportionation or recombination, are very substantially suppressed. In the present context, reversible addition-fragmentation chain-transfer polymerization (RAFT) has been found to be particularly preferable.

The initiator used for the polymerization is more preferably an azo compound and/or a peroxide as free-radical initiator, which is at least one representative selected from the group consisting of dibenzoyl peroxide (DBPO), di-tert-butyl peroxide, diacetyl peroxide, azobisisobutyronitrile (AIBN), α,α'-azodiisobutyramidine dihydrochloride (AAPH) and/or azobisisobutyramidine (AIBA).

If the polymerization is effected in an aqueous solution or in water, α,α'-azodiisobutyramidine dihydrochloride (AAPH) is advantageously used as initiator.

For control of the polymerization, in particular, one or more representatives from the group consisting of dithioesters, dithiocarbamates, trithiocarbonates and/or xanthates are used.

It has additionally been found to be advantageous when the polymerization is effected at least partly, preferably fully, in an aqueous solution.

More particularly, during the polymerization, a molar ratio of free ionizable monomers m1 to free side chain-bearing monomers m2 is at least temporarily altered.

Specifically, the alteration of the molar ratio includes stepwise and/or a continuous alteration. It is thus possible to form, in an efficiently controllable manner, a block structure and/or a concentration gradient or a gradient structure.

Optionally, during the polymerization, either a continuous change or a stepwise change in the molar ratio of the free ionizable monomers m1 to the free side chain-bearing monomers m2 is effected. This stepwise change is especially effected prior to conduction of the continuous change. In this way, for example, a copolymer comprise two or more sections having different structure is obtainable.

For formation of copolymers having block and/or gradient structures, the ionizable monomers m1 and the side chain-bearing monomers m2 are preferably at least partly added at different times.

In a further preferred embodiment, in the polymerization, in a first step a), a portion of the ionizable monomers m1 is converted or polymerized and, after attainment of a predetermined conversion, in a second step b), the as yet unconverted ionizable monomers m1 are polymerized together with the side chain-bearing monomers m2. Step a) is especially effected essentially in the absence of side chain-bearing monomers m2.

In this way, in a simple and inexpensive manner, a copolymer having a section consisting essentially of polymerized ionizable monomers m1 followed by a section having gradient structure is preparable.

In accordance with a very particularly preferred embodiment, in the polymerization, in a first step a), a portion of the side chain-bearing monomers m2 is converted or polymerized and, after attainment of a predetermined conversion, in a second step b), the as yet unconverted side chain-bearing monomers m2 are polymerized together with the ionizable monomers m1. Step a) is especially effected essentially in the absence of ionizable monomers m1.

In this way, for example, in a simple and inexpensive manner, a copolymer having a section consisting essentially of polymerized side chain-bearing monomers m2 followed by a section having gradient structure is preparable.

It is advantageous here to conduct steps a) and b) in immediate succession. In this way, it is possible to maintain the polymerization reaction in steps a) and b) to the best possible degree.

The polymerization in step a) is especially conducted until 0.1-100 mol %, especially 1-95 mol %, preferably 10-90 mol %, in particular 25-85 mol %, of the ionizable monomers m1 or of the side chain-bearing monomers m2 have been converted or polymerized.

The conversion of the monomers m1 and m2 or the progress of the polymerization can be monitored in a manner known per se, for example, with the aid of liquid chromatography, especially high-performance liquid chromatography (HPLC).

More particularly, the copolymer consists to an extent of at least 50 mol %, in particular at least 75 mol %, especially at least 90 mol % or 95 mol %, of polymerized ionizable monomers m1 and polymerized side chain-bearing monomers m2.

The copolymer may be prepared in liquid or solid form. More preferably, the copolymer is present as a constituent of a solution or dispersion, wherein a proportion of the copolymer is especially 10-90% by weight, preferably 25-65% by weight. This means that the copolymer can be added, for example, very efficiently to binder compositions. If the copolymer is being prepared in solution, especially in aqueous solution, it is additionally possible to dispense with further processing.

In accordance with another advantageous embodiment, a copolymer is prepared in the solid state of matter, especially in the form of a powder, in the form of pellets and/or sheets. This especially simplifies the transport of the copolymers. Solutions or dispersions of the copolymers can be converted to the solid state of matter, for example, by spray-drying.

According to the reaction regime, it is possible by the process of the invention to prepare polymers having a given or well-defined structure in a controlled manner. More particularly, for example, copolymers having block structure and/or copolymers having gradient structure are obtainable.

Preparation of Copolymers with Gradient Structure

The following procedure has been found to be particularly preferable for preparation of copolymers comprising a gradient structure: in a first step a), at least a portion of the side chain-bearing monomers m2 is reacted or polymerized and, after attainment of a predetermined conversion, in a second step b), the ionizable monomers m1 are polymerized together with as yet unconverted side chain-bearing monomers m2. Step a) is in particular effected in the absence of ionizable monomers m1.

It is also possible, in a first step a), to react or polymerize at least a portion of the ionizable monomers m1 and, after attainment of a predetermined conversion, in a second step b), to polymerize the side chain-bearing monomers M2, optionally together with any as yet unconverted ionizable monomers m1. Step a) is in particular effected in the absence of ionizable monomers m2.

More particularly, by the former process, it is possible in an efficient and inexpensive manner to prepare copolymers having a section consisting essentially of polymerized side chain-bearing monomers m2 followed by a section with gradient structure.

The polymerization in step a) is especially conducted until 1-74 mol %, preferably 10-70 mol %, in particular 25-70 mol %, especially 28-50 mol % or 30-45 mol %, of the side chain-bearing monomers m2 or of the ionizable monomers m1 have been converted or polymerized.

In a further advantageous embodiment, in step a) and/or in step b), there is at least one further polymerizable monomer ms of the formula VI as described above. The at least one further polymerizable monomer ms in this case is especially polymerized together with the monomer m1 and/or the monomer m2.

Alternatively, it is possible, in addition to step a) and step b), to provide a further step c) for polymerization of the at least one further polymerizable monomer ms. In this way, it is possible to prepare a copolymer having an additional section C. More particularly, step c) can be conducted between step a) and step b) in time. Thus, the additional section C is arranged between sections AA and AB in space.

Alternatively, it is possible to conduct step c) before or after steps a) and b). Thus, the additional section C may be arranged after section AA or before section AB.

Advantageous proportions, ratios and configurations of the monomers m1, m2, ms and of any further monomers correspond to the proportions, ratios and configurations already cited above, which have been described in connection with the monomer units M1, M2 and MS.

Preparation of a Copolymer with Block Structure

The following procedure has been found to be particularly preferable for preparation of copolymers comprising a block structure: in a first step a), at least a portion of the side chain-bearing monomers m2 is reacted or polymerized and, after attainment of a predetermined conversion, in a second step b), the ionizable monomers m1 are polymerized, optionally together with any as yet unconverted side chain-bearing monomers m2. Step a) is in particular effected in the absence of ionizable monomers m1.

The polymerization in step a) is especially conducted until 75-95 mol %, preferably 85-95 mol %, especially 86-92 mol %, of the originally charged monomers m2 have been converted/polymerized.

More particularly, the polymerization in step b) is especially conducted until 75-95 mol %, especially 80-92 mol %, of the originally charged monomers m1 have been converted/polymerized.

The sequence of steps a) and b) may, however, in principle also be switched.

Alternatively, it is possible, in addition to step a) and step b), to provide a further step c) for polymerization of the at least one further polymerizable monomer ms. In this way, it is possible to prepare a block copolymer having an additional block C. More particularly, step c) is conducted between step a) and step b) in time. Thus, the additional block C is arranged between the A and B blocks in space.

Advantageous proportions, ratios and configurations of the monomers m1, m2, ms and of any further monomers correspond to the proportions, ratios and configurations already cited above, which have been described in connection with the monomer units M1, M2 and MS.

Uses of the Copolymer

The copolymers of the invention are particularly advantageous when they are used as dispersants for binder compositions based on calcium sulfate.

The copolymers of the invention can especially be used as plasticizers, as water reducers or for improving the processibility and flowability of the calcium sulfate-based binder compositions produced therewith.

It is likewise possible to use the copolymer for control of the setting characteristics of binder compositions based on calcium sulfate. What this means is more particularly that the copolymer can be used for adjustment of the initial setting time and/or the final setting time of binder compositions based on calcium sulfate.

A "binder composition based on calcium sulfate" in the present context is understood to mean a composition which contains at least one mineral binder and wherein a proportion of calcium sulfate in the mineral binder, based on the total weight of the mineral binder, is at least 30% by weight, preferably at least 50% by weight, even more preferably at least 70% by weight, especially at least 90% by weight or 100% by weight.

The calcium sulfate may be in any known form, especially in the form of calcium sulfate dihydrate, calcium sulfate α-hemihydrate, calcium sulfate β-hemihydrate, calcium sulfate anhydrite or mixtures thereof. Particular preference is given to calcium sulfate α-hemihydrate and/or calcium sulfate β-hemihydrate.

The expression "mineral binder" is especially understood to mean a binder which reacts in the presence of water in a hydration reaction to give solid hydrates or hydrate phases. This may, for example, be a hydraulic binder (e.g. cement or hydraulic lime), a latently hydraulic binder (e.g. slag), a pozzolanic binder (e.g. fly ash) or a nonhydraulic binder (gypsum or white lime).

In a preferred use, the mineral binder contains less than 20% by weight, particularly less than 10% by weight, preferably less than 5% by weight, especially less than 1% by weight, of cement. The binder composition based on calcium sulfate is especially cement-free.

In particular, the copolymer is used in the production of gypsum boards. Gypsum boards are understood to mean, for example, gypsum plasterboards in which a gypsum core is enclosed between two cardboard sheets, gypsum fiberboards which additionally contain fibers, and gypsum wall boards which are typically cast into a mold. The gypsum compositions of the invention are particularly suitable for gypsum plasterboards in which a gypsum core comprising or consisting of calcium sulfate β-hemihydrate and a copolymer of the invention is enclosed between cardboard sheets.

The term "gypsum" includes any known form of gypsum, in particular calcium sulfate dihydrate, calcium sulfate α-hemihydrate, calcium sulfate β-hemihydrate, calcium sulfate anhydrite or mixtures thereof.

In a particularly preferred embodiment, the binder composition based on calcium sulfate comprises a calcium sulfate β-hemihydrate and the binder composition is used for production of gypsum boards. Preferably, the binder composition based on calcium sulfate comprises at least 70% by weight of calcium sulfate β-hemihydrate, even more preferably at least 90% by weight of calcium sulfate β-hemihydrate, based on the total weight of the mineral binder in the binder composition.

The copolymer is advantageously used with a proportion of 0.01-10% by weight, especially 0.1-7% by weight or 0.2-5% by weight, based on the binder content.

A further aspect of the present invention relates to a binder composition comprising calcium sulfate and a copolymer as described above. The binder composition, based on all the mineral binder, contains especially at least 30% by weight, preferably at least 50% by weight, even more preferably at least 70% by weight, especially at least 90% by weight or 100% by weight, of calcium sulfate. The calcium sulfate is defined here as described above.

A weight ratio of water to binder in the binder composition is preferably in the range of 0.25-0.7, particularly 0.26-0.65, preferably 0.27-0.60, especially 0.28-0.55.

In particular, the binder composition is a gypsum plaster, a floor covering and/or a screed.

The binder composition is preferably a workable binder composition and/or one which is made up with water.

An additional aspect of the present invention relates to a shaped body, especially a constituent of a building material or of a built structure, obtainable by curing a binder composition comprising a copolymer as described above after addition of water. A built structure may, for example, be a bridge, a building, a tunnel, a roadway or a runway.

However, the shaped body may also be a filling and/or a coating, for example a gypsum plaster, a floor covering or a screed.

The shaped body may also be a product which arises in the distribution and curing of spackling compound, for example a filling of a cavity or a join.

In a particularly preferred embodiment, the shaped body is a gypsum plasterboard or a sculpture.

Further advantageous embodiments of the invention will be apparent from the working examples which follow.

BRIEF DESCRIPTION OF THE DRAWING

The figures used to elucidate the working examples show.

WORKING EXAMPLES

1. Copolymers 1.1 Copolymer CP1 (Block Copolymer)

For preparation of the copolymer, a round-bottom flask equipped with a reflux condenser, stirrer system, thermometer and an inert gas inlet tube is initially charged with 57.4 g of 50% methoxy polyethylene glycol 1000 methacrylate (0.03 mol) and 21 g of deionized water. The reaction mixture is heated to 80° C. with vigorous stirring. A gentle inert gas stream is passed through the solution during the heating and over all the remaining reaction time. 378 mg of 4-cyano-4-(thiobenzoyl)pentanoic acid (1.4 mmol) are then added to the mixture. Once the substance has fully dissolved, 67 mg of AIBN (0.41 mmol) are added. From then on, the conversion is determined regularly by means of HPLC.

As soon as the conversion, based on methoxy polyethylene glycol methacrylate, exceeds 90%, 3.9 g of acrylic acid (0.05 mol) are added to the reaction mixture. The mixture is left to react for a further 4 h and then to cool.

What remains is a clear, pale reddish, aqueous solution having a solids content of around 40%.

Owing to the virtually complete conversion (90%) of the methoxy polyethylene glycol 1000 methacrylate prior to the addition of the acrylic acid, the copolymer CP1 has a block structure.

1.2 Copolymer CP2 (Block Copolymer)

For preparation of the copolymer, a round-bottom flask equipped with a reflux condenser, stirrer system, thermometer and an inert gas inlet tube is initially charged with 57.4 g of 50% methoxy polyethylene glycol 1000 methacrylate (0.03 mol) and 21 g of deionized water. The reaction mixture is heated to 80° C. with vigorous stirring. A gentle inert gas stream is passed through the solution during the heating and over all the remaining reaction time. 504 mg of 4-cyano-4-(thiobenzoyl)pentanoic acid (1.8 mmol) are then added to the mixture. Once the substance has fully dissolved, 90 mg of AIBN (0.55 mmol) are added. From then on, the conversion is determined regularly by means of HPLC.

As soon as the conversion, based on methoxy polyethylene glycol methacrylate, exceeds 90%, 3.9 g of acrylic acid (0.05 mol) are added to the reaction mixture. The mixture is left to react for a further 4 h and then to cool. What remains is a clear, pale reddish, aqueous solution having a solids content of around 40%.

1.3 Copolymer CP3 (Block Copolymer)

For preparation of the copolymer, a round-bottom flask equipped with a reflux condenser, stirrer system, thermometer and an inert gas inlet tube is initially charged with 57.4 g of 50% methoxy polyethylene glycol 1000 methacrylate (0.03 mol) and 23 g of deionized water. The reaction mixture is heated to 80° C. with vigorous stirring. A gentle inert gas stream is passed through the solution during the heating and over all the remaining reaction time. 504 mg of 4-cyano-4-(thiobenzoyl)pentanoic acid (1.8 mmol) are then added to the mixture. Once the substance has fully dissolved, 90 mg of AIBN (0.55 mmol) are added. From then on, the conversion is determined regularly by means of HPLC.

As soon as the conversion, based on methoxy polyethylene glycol methacrylate, exceeds 90%, 5.2 g of acrylic acid (0.07 mol) are added to the reaction mixture. The mixture is left to react for a further 4 h and then to cool. What remains is a clear, pale reddish, aqueous solution having a solids content of around 40%.

1.4 Copolymer CP4 (Gradient Polymer)

For preparation of the gradient polymer by means of RAFT polymerization, a round-bottom flask equipped with a reflux condenser, stirrer system, thermometer and a gas inlet tube is initially charged with 57.4 g of 50% methoxy polyethylene glycol 1000 methacrylate (0.03 mol) and 22 g of deionized water. The reaction mixture is heated to 80° C. with vigorous stirring. A gentle N2 inert gas stream is passed through the solution during the heating and over all the remaining reaction time. 378 mg of 4-cyano-4-(thiobenzoyl) pentanoic acid (1.35 mmol) are then added to the mixture. Once the substance has fully dissolved, 67 mg of AIBN (0.41 mmol) are added. From then on, the conversion is determined regularly by means of HPLC.

As soon as the conversion, based on methoxy polyethylene glycol methacrylate, is 65 mol %, 4.66 g of methacrylic acid (0.05 mol) dissolved in 20 g of $H_2O$ are added dropwise within 20 min. After this has ended, the mixture is left to react for a further 4 h and then to cool. What remains is a clear, pale reddish, aqueous solution having a solids content of around 35%. The copolymer with gradient structure thus obtained is referred to as copolymer CP4.

Figure 1:
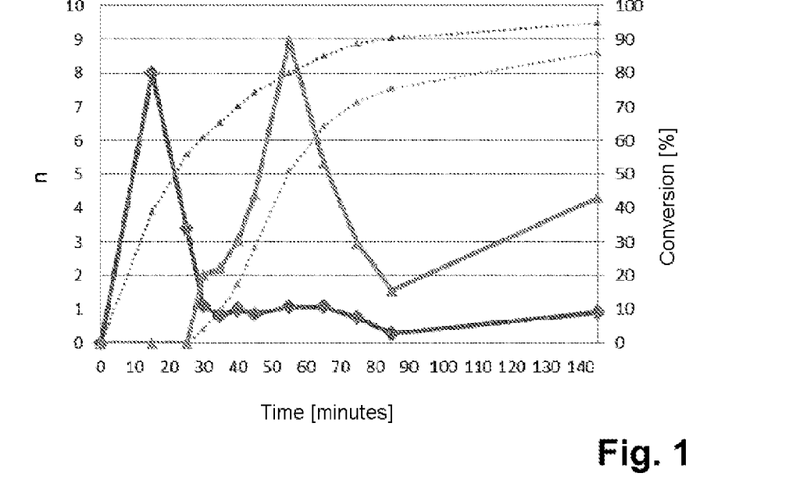
FIG. 1: The plot of the monomer conversions against time in the preparation of a copolymer of the invention (CP4)

FIG. 1 shows the plot of the monomer conversions against time in the preparation of the copolymer CP4. The monomer conversions were determined in a manner known per se at the times given in FIG. 1 during the preparation of the copolymer by high-performance liquid chromatography (HPLC). The upper dotted curve which begins at the origin at time t=0 minutes represents the percentage conversion of the methoxy polyethylene glycol methacrylate monomers (=side chain-bearing monomers m2) (scale to the right). The lower dotted curve which begins at time t=25 minutes represents the percentage conversion of the methacrylic acid monomers (=ionizable monomers m1) (scale to the right). The solid line with the diamond-shaped points indicates the number of side chain-bearing monomers m2 which have been polymerized since the preceding measurement point (=n(M2); left-hand scale). Correspondingly, the solid line with the triangular points indicates the number of ionizable monomers m1 which have been polymerized since the preceding measurement point (=n(M1); left-hand scale).

Using the data in FIG. 1 for the period from 0 to 55 minutes at the particular time to calculate the ratio n(M2)/[n(M1)+n(M2)] and n(M1)/[n(M1)+n(M2)], the following values are found:

TABLE 1

Monomer ratios during the preparation of the copolymer CP4.

| Time | n(M2)/[n(M1) + n(M2)] | n(M1)/[n(M1) + n(M2)] |
|---|---|---|
| 15 | 100% | 0% |
| 25 | 100% | 0% |
| 30 | 33% | 67% |
| 35 | 29% | 71% |
| 40 | 25% | 75% |
| 45 | 17% | 83% |
| 55 | 10% | 90% |

It is apparent from table 1 that, in the preparation of the copolymer CP4, during the first 25 minutes, a section consisting of 100% side chain-bearing monomer units M2 is formed, followed by a section in which the proportion of side chain-bearing monomer units M2 decreases continuously while the proportion of ionizable monomer units M1 increases continuously.

Figure 2:
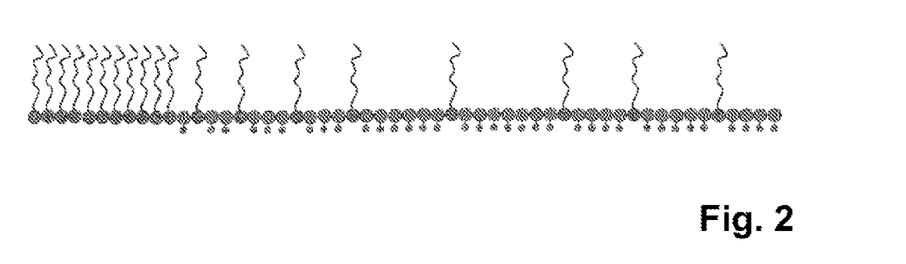
FIG. 2: A schematic diagram of a possible structure of a copolymer which can be derived from the conversions according to FIG. 1.

FIG. 2 additionally shows a schematic of a possible structure of the copolymer CP4. This can be inferred directly from the conversions shown in FIG. 1. The side chain-bearing monomer units M2 (=polymerized methoxy polyethylene glycol methacrylate monomers) are represented as a circle with a twisted appendage. The ionizable monomer units M1 are represented as dumbbell-shaped symbols.

It is apparent from FIG. 2 that copolymer CP4 comprises a first section AA with gradient structure and a further section AB consisting essentially of side chain-bearing monomer units.

1.5 Comparative Polymer PR1 (Statistical Copolymer)

For comparative purposes, a commercially available dispersant of the "Sika® ViscoCrete® G-2" type (obtainable from Sika Deutschland GmbH) was used. This is a comb polymer having a polycarboxylate backbone and polyether side chains which is prepared by a polymer-analogous reaction of a polycarboxylic acid with singly hydroxy- and amine-terminated polyether side chains. The sequence of the monomer units in the comparative polymer is purely random, i.e. purely statistical. Otherwise, the comparative polymer, however, is comparable to the copolymers described above.

2. Tests in Calcium Sulfate-Based Binder Compositions

2.1 Production of the Binder Compositions

For production of a gypsum slurry, 140 g of water were initially charged together with 1 g in each case of a 40% copolymer solution (corresponding to 0.2% by weight of plasticizer based on the total weight of the calcium sulfate β-hemihydrate). Then 200 g of calcium sulfate β-hemihydrate, 0.2 g (0.1% by weight based on the total weight of the calcium sulfate β-hemihydrate) of an accelerator in the form of calcium sulfate dihydrate (obtainable, for example, from Fluka Schweiz) were scattered into the water within 15 seconds and the gypsum slurry was left to settle for 15 seconds. Subsequently, the mixture was manually stirred vigorously for 30 seconds.

2.2 Test Methods

To test the flow and setting characteristics, a mini-cone having a diameter of 50 mm and a height of 51 mm was filled with the gypsum slurry made up in each case and the slump (ABM) in mm was determined after 75 seconds (in accordance with EN 1015-3). The diameter of the gypsum cake that forms was measured as soon as no flow was observed any longer. The diameter in mm is referred to as the slump.

The initial setting time and the final setting time were determined by the knife cut method according to DIN EN 13279-2 and the thumbprint method. The initial setting time (VB) has been reached when, after a knifecut through the gypsum cake, the cut edges no longer flow together. The final setting time (VE) has been attained when no water separates any longer from the gypsum cake when a fingerprint expends pressure of about 5 kg.

2.3 Test Results

Table 2 gives an overview of the experiments conducted and the results achieved. Experiment V1 is a blank experiment conducted for comparative purposes without addition of a polymer.

TABLE 2

Results

| No. | Polymer | ABM [mm] | VB [h:min] | VE [h:min] | $\Delta_{VE-VB}$ [h:min] |
|---|---|---|---|---|---|
| V1 | — | 120 | 2:25 | 6:12 | 3:47 |
| V2 | PR1 | 206 | 4:07 | 12:34 | 8:27 |
| V3 | CP1 | 203 | 2:53 | 7:41 | 4:48 |
| V4 | CP2 | 212 | 3:40 | 8:49 | 5:09 |
| V5 | CP3 | 211 | 4:08 | 10:29 | 6:21 |

The experiments show that the copolymers of the invention (experiments V3 to V5) compared to the conventional dispersant (experiment V2), given the same dosage, result in comparable or even better slump, but at the same time clearly have lower retardation and enable quicker setting.

However, the above-described embodiments should be regarded merely as illustrative examples which can be modified as desired within the scope of the invention.

The invention claimed is:

1. A method comprising introducing a copolymer as a dispersant into a binder composition that includes at least one mineral binder, the binder composition being based on calcium sulfate, wherein
the copolymer comprises a polymer backbone and side chains bonded thereto and there are at least one ionizable monomer unit M1 and at least one side chain-bearing monomer unit M2,
the copolymer has a nonrandom distribution of the monomer units M1 and/or the monomer units M2 in a direction along the polymer backbone in that the copolymer has a gradient structure in at least one section AA in a direction along the polymer backbone with respect to the ionizable monomer unit M1 and/or with respect to the side chain-bearing monomer unit M2, and the copolymer, in addition to the at least one section AA having a gradient structure, has a further section AB, wherein there is essentially a constant local concentration of the monomers and/or a statistical or random distribution of the monomers over the entire section AB,
a proportion of the calcium sulfate, based on all the mineral binder in the binder composition, is at least 30% by weight,
a molar ratio of the monomer units M1 to the monomer units M2 in the copolymer is in the range of 0.5-6,
the ionizable monomer unit M1 in the copolymer has a structure of the formula I the side chain-bearing monomer unit M2 includes a structure of the formula II where
R$^1$ forms a ring together with R$^4$ to give —CO—O—CO—, or R$^1$, in each case independently, is —COOM and/or —SO$_2$-0M, and R$^4$, in each case independently, is H, —COOM or an alkyl group having 1 to 5 carbon atoms;
M, independently of one another, represents H$^+$, an alkali metal ion, an alkaline earth metal ion, a di- or trivalent metal ion, an ammonium ion or an organic ammonium group;
R$^2$, R$^3$, R$^5$ and R$^6$, in each case independently, are H or an alkyl group having 1 to 5 carbon atoms;
R$^7$, in each case independently, is H, —COOM or an alkyl group having 1 to 5 carbon atoms;
m=0, 1 or 2;
p=0 or 1;
X, in each case independently, is —O— or —NH—;
R$^8$ is a group of the formula -[AO]$_n$—R$^a$, where A=C$_2$- to C$_4$-alkylene, R$^a$ is H, a C$_1$- to C$_{20}$-alkyl group, -cycloalkyl group or -alkylaryl group; and
n=2-250.

2. The method as claimed in claim 1, wherein the copolymer comprises the gradient structure and a block structure comprising an essentially constant local concentration of monomers.

3. The method as claimed in claim 1, wherein the copolymer comprises at least one further monomer unit MS of the formula III:

(III)

where $R^{5'}$ and $R^{6'}$, in each case independently, are H or an alkyl group having 1 to 5 carbon atoms,
$R^{7'}$ is H, —COOM or an alkyl group having 1 to 5 carbon atoms,
m'=0, 1 or 2, and
p'=0 or 1;
Y, in each case independently, is a chemical bond or —O—;
Z, in each case independently, is a chemical bond, —O— or —NH—;
$R^9$, in each case independently, is an alkyl group, cycloalkyl group, alkylaryl group, aryl group, hydroxyalkyl group or acetoxyalkyl group, each having 1-20 carbon atoms.

4. The method as claimed in claim 1, wherein the copolymer further comprises at least one first block A consisting of the ionizable monomer unit M1 and at least one second block B consisting of the side chain-bearing monomer unit M2.

5. The method as claimed in claim 1, wherein the polydispersity of the copolymer is <1.5.

6. The method as claimed in claim 1, wherein the molar ratio of the monomer units M1 to the monomer units M2 in the copolymer is in the range of 2-3.5.

7. The method as claimed in claim 1, wherein $R^1$=COOM; $R^2$ and $R^5$, independently of one another, are H, —$CH_3$ or mixtures thereof; $R^3$ and $R^6$, independently of one another, are H or —$CH_3$, and where X in at least 75 mol % of all monomer units M2 is —O—.

8. The method as claimed in claim 1, wherein the copolymer is prepared by a controlled free-radical polymerization and/or a living free-radical polymerization.

9. The method as claimed in claim 1, wherein the copolymer is used for control of the setting characteristics of the binder composition.

10. The method as claimed in claim 1, wherein all the copolymer present in the binder composition as a dispersant contains only monomer units that are selected from the group consisting of the ionizable monomer unit M1 and the side chain-bearing monomer unit M2.

* * * * *